UNITED STATES PATENT OFFICE 2,586,656

S-AMINOALKYLIDENE DITHIOPHOSPHORIC ACID TRIESTERS

Edwin O. Hook, Old Greenwich, Conn., and Philip H. Moss, Seldovia, Alaska, assignors to American Cyanamid Company, New York, N. Y., a corporation of Maine No Drawing. Application August 18, 1949, Serial No. 111,081

5 Claims. (Cl. 260—461)

This invention relates to S-aminoalkylidene dithiophosphoric acid triesters and to their methods of preparation. The invention includes the novel dithiophosphoric acid triesters themselves, methods for preparing the same, and hydrocarbon oil compositions containing them.

The O,O-diesters of dithiophosphoric acid are well-known compounds, and are usually prepared by condensing alcohols or phenols with phosphorus pentasulfide. We have found that a novel class of dithiophosphoric acid triesters, which are hereinafter described as S-aminoalkylidene dithiophosphoric acid triesters, can be produced by condensing these O,O-dithiophosphoric acid diesters with aldehydes of the aliphatic or aromatic series and with amines containing at least one replaceable hydrogen atom attached to an amino nitrogen atom.

When a monoamine of the aliphatic, aromatic or heterocyclic series is employed, or when a corresponding polyamine is used in amounts such that one molecular equivalent of dithiophosphoric acid diester and of aldehyde is present for each reactive amino group the reaction proceeds as follows:

(1)

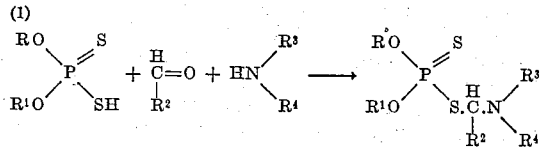

In these formulas each of R and $R^1$ is an aliphatic or aromatic radical, $R^2$ is hydrogen or an aliphatic or aromatic radical, $R^3$ is an alophatic, aromatic or heterocyclic radical, and $R^4$ is hydrogen (when a primary amine is used) or an aliphatic, aromatic or heterocyclic radical. It will be understood that the term "aliphatic radical" includes alkyl, cycloalkyl and aralkyl radicals as well as substituted aliphatic radicals.

When larger quantities of the dithiophosphoric acid diester and aldehyde are reacted with a diamine or polyamine the condensation takes place at each amino group that contains a replaceable hydrogen atom, and a polydithiophosphoric acid triester is produced. This is best illustrated by the reaction between an O,O-dialkyl dithiophosphoric acid, formaldehyde, and ethylene diamine as follows:

(2)

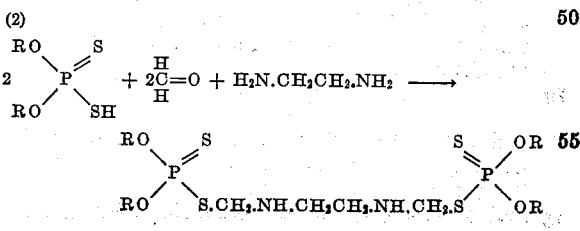

in which each R is an aliphatic radical such as methyl, ethyl, propyl, butyl, amyl and the like.

The condensation reaction of our invention takes place when the reagents are mixed together at ordinary room temperatures or at elevated temperatures up to 100° C. or higher; however, the use of temperatures above the boiling point of water is usually undesirable because the free dithiophosphoric acid tends to lose hydrogen sulfide. Accordingly, the process of our invention is preferably carried out by simply mixing the reagents together at room temperature or at slightly elevated temperatures for periods of time sufficient to complete the condensation reaction; usually within from about 2-3 hours to about 24 hours.

Any O,O-dialiphatic dithiophosphoric acid diester including the dicycloalkyl dithiophosphoric acid esters or any O,O-diaryl dithiophosphoric acid ester or any mixed O,O-diester of dithiophosphoric acid may be used in practicing the process of our invention and in producing the novel products thereof. When compounds having a relatively high percentage of combined phosphorus and sulfur are desired, as in the production of lubricating oil antioxidants having a high activity at relatively low temperatures which is sometimes required in turbine oils and anticorrosion oils, it is preferable to employ an O,O-dialkyl dithiophosphoric acid in which the alkyl groups are of relatively low molecular weight, such as methyl, ethyl, propyl, or butyl radicals. Dialkyl dithiophosphoric acids of higher molecular weight may of course be employed, such as diamyl, di-n-hexyl, dicyclohexyl or dioctyl dithiophosphoric acids, as well as the didecyl, didodecyl, ditetradecyl or dioctadecyl dithiophosphoric acids. The O,O-diaryl dithiophosphoric acids may frequently be used to advantage in the production of lubricating oil additives wherein the O,O-di-phenyl-, O,O-dialkyl-phenyl-, and O,O-dinaphthyl dithiophosphoric acids may be employed.

Still other diaryl dithiophosphoric acids may be used in the production of compounds for other purposes; thus, for example, in the production of insecticides and fungicides the use of O,O-dichlorphenyl or di-bromphenyl dithiophosphoric acids for condensation in accordance with the process of the invention is frequently advantageous. It will be understood that mixed O,O-dithiophosphoric acid diesters may also be employed, as where a mixed alkyl-phenyl dithiophosphoric acid is used to combine the oil-solubilizing properties of an aliphatic radical with the heat-stabilizing and sludge-inhibiting properties of the phenolic and particularly the alkyl-phenyl derivatives in a lubricating oil.

Any aliphatic monoamine or polyamine may be used in practicing the process of our invention for the formation of the novel products thereof. Aliphatic monoamines which may be used include the saturated primary amines such as ethylamine, methylamine, etc. up to and including octadecylamine, and either the straight-chain or branched-chain primary amines of this character may be used. The corresponding unsaturated amines may also be employed as well as commercial mixtures; thus, for example, a mixture of saturated and unsaturated primary straight-chain aliphatic amines of 16-18 carbon atoms is sold commercially and is of value in the preparation of lubricating oil additives, since the long hydrocarbon chains of these amines promote oil-solubility in the finished products. The corresponding dialiphatic secondary amines in which each aliphatic radical contains from 1-18 carbon atoms may also be employed, such as dimethylamine, diethylamine, dipropylamine, dioctylamine and the like. Similarly, mixed alkyl amines such as methylethylamine, ethylbutylamine and the like may be employed.

The preferred S-aminoalkylidene dithiophosphoric acid triesters of our invention are those prepared from aniline, substituted anilines and other aromatic amines such as naphthylamine, p-phenylenediamine and the like. Alkyl anilines which may be used include both the N-alkyl compounds such as N-ethyl aniline, N-butyl aniline, N-octyl aniline and the like and nuclear substituted alkyl anilines such as the toluidenes, xylidins, and higher alkyl-substituted amidobenzols.

Heterocyclic amines which may be employed are illustrated by 2-amidopyridine, 2-aminopyrimidine, 2-amino, 4 or 6-monomethyl, monoethyl, monopropyl or monobutyl pyrimidine, 2-amino-4, 6-dimethyl, diethyl or dibutyl pyrimidine and the like.

Although formaldehyde is the preferred aldehydic condensing agent for use in preparing compounds of the present invention, other aliphatic or aromatic aldehydes may be employed, typical examples being acetaldehyde, butyraldehyde, isobutyraldehyde, valeraldehyde, hexaldehyde, octanaldehyde, myristaldehyde, stearaldehyde, benzaldehyde, substituted benzaldehydes, cinnamaldehyde, and the like.

As is noted above, the condensation between the O,O-dithiophosphoric acid diesters and the aldehyde and amine can be carried out simply by mixing these reagents together. However, in some cases a better control of the reaction is obtained by first mixing together the aldehyde and the amine with positive cooling, as by immersing the reaction vessel in ice water or by passing cold brine through coils immersed therein, in order to absorb the heat of reaction between the aldehyde and the amine. The acid is then preferably added with agitation to complete the reaction. When monoamines are used it is unnecessary to maintain any particular ratio of reacting ingredients, as the three reagents condense in equimolecular ratios; however, when a polyamine is employed the nature of the final condensation product is determined by the molecular ratio of the polyamine, on the one hand, and the dithiophosphoric acid diester and aldehyde on the other. This ratio may vary from equimolecular quantities up to the use of one mol of the dithiophosphoric acid and of the aldehyde for each reactive amino group of the amine. Frequently, it is advantageous to carry out the condensation in the presence of non-reactive diluents such as volatile hydrocarbons of the type of benzene, toluene, solvent naphtha, chlorinated hydrocarbons and the like.

The condensation product is easily recovered in a purified form by washing the reaction mixture with water or with a dilute aqueous sodium or potassium carbonate solution, or both, followed by heating to 90-100° C. at reduced pressure to strip off volatile impurities. The purified products vary in form from liquids to crystalline solids, many of which are soluble in hydrocarbon solvents, including both the paraffin-base and naphthenic-base lubricating oils, and possess good antioxidant and anticorrosion properties therefor. Many of them also possess good insecticidal and fungicidal properties and may be employed in the form of sprays, dusts, aerosols and the like for pest control purposes.

The novel products of the present invention are preferably used in lubricating oils in relatively small quantities which may vary from about 0.1% up to about 4-5% or greater, depending on the particular oil and on the degree of protection desired therein. In automobile engine lubricating oils, quantities on the order of 0.2% to 2-3% are usually incorporated into the oil. Our novel antioxidants are compatible with all of the commonly used detergents, stabilizers, sludge-inhibitors and other ingredients of compounded oils and may be used in conjunction with smaller or larger quantities of aliphatic or aromatic sulfonates such as calcium petronate, alkyl phenol sulfides such as p-p'-dibutyl-, diamyl- or dioctyl phenol mono- or polysulfides and their polyvalent metal salts, 2,4-dialkyl phenol mono-or polysulfides and their metal salts, or salts of oxygen- or sulfur-containing acids of phosphorus such as those described in U. S. Patents Nos. 2,364,284 and 2,228,658 and Reissue 22,829. These and other additives are usually employed in the oils in quantities of about 0.1-5%, most commonly in quantities of about 0.5-2%, in admixture with the antioxidants of the present invention.

The invention will be further illustrated in greater detail by the following specific examples. It should be understood, however, that although these examples may describe in detail some of the specific features of the invention, they are given primarily for purposes of illustration and the invention in its broader aspects is not limited thereto.

*Example 1*

Sixty-three grams (0.8 mol) of diethylamine was added to 70 grams (0.86 mol) of 37% formalin with stirring and cooling during 40 minutes. Then 189 grams (0.86 mol) of diethyldithiophosphoric acid (neutralization equivalent 220) was added during 1½ hours while maintaining the internal temperature below 15° C. by immersing the reaction flask in ice water. Stirring was then continued for an additional 45 minutes at 15-20° C., after which the resulting colorless liquid was heated on a steam bath at 90° C. for 1½ hours. The product was allowed to stand overnight and was then dissolved in benzene, washed with water, and the solvent and volatiles removed by stripping at 95° C. under a reduced pressure of 30 mm. of Hg. The yield was 263 grams of a clear viscous yellow liquid which turned crystalline on standing.

*Example 2*

A mixture of 40 grams of "B-24 alcohol" (see U. S. Patent 2,368,000), 30 grams of n-decanol, 20 grams of p-octylphenol and 10 grams of methylisobutylcarbinol was reacted with 41 grams of P2S5 at 95° C. for about 2½ hours and the resulting dithiophosphoric acid diester was filtered.

Twenty-one grams of anhydrous diethylamine was slowly dripped with stirring into 24 grams of 37% formalin. Following this, 119 grams of the dithiophosphoric acid diester described above was added during one hour. The reaction flask was cooled with ice water during the amine addition and also during the first half of the dithiophosphoric acid ester addition. When all of the ester had been added, the mixture was stirred at 25° C. for 16 hours and was then warmed on a steam bath for 1½ hours. The resulting product was diluted with ethylene dichloride and washed with water, then with a 5% aqueous sodium carbonate solution, and finally twice more with water. After removing the solvent by distillation under reduced pressure there remained 140 grams of a very viscous, dark brown liquid, which was the mixed dithiophosphato-methyl-diethylamine.

The product was evaluated as a lubricating oil antioxidant by dissolving a portion in an SAE 30 Mid-Continent base lubricating oil to a 0.5% solution together with 0.04% of iron naphthenate, based on the Fe2O3 equivalent, and subjecting the oil to the Underwood oxidation test. In this test 1500 cc. of the oil is heated for 10 hours at 325° F. in an open container providing free circulation of air while portions of the oil are sprayed continuously against two freshly sanded alloy bearings. When silver cadmium alloy bearings were used in the test with the above oil containing the iron naphthenate oxidation catalyst but no antioxidant the loss in weight due to corrosion was 1097 mg. With the same oil containing 0.5% by weight of the additive the bearing loss due to corrosion was 9 mg.

Example 3

A solution of 22 grams (0.25 mol) of N,N'-dimethylethylenediamine in 100 cc. of dioxane was stirred and 44 grams (0.55 mol) of 37% formalin was added during 15 minutes. Then 105 grams (0.5 mol) of distilled diethyl dithiophosphoric acid (Neutralization Equivalent 208) was added in 15 minutes while keeping the internal temperature below 25° C. by cooling the reaction flask with ice water. The resulting colorless liquid was stirred for ½ hour and then allowed to stand overnight. The next day it was diluted with ethylene dichloride, washed with hot water, and stripped of solvent and volatiles by distillation at reduced pressure. The yield was 128 grams of N,N'-di-(O,O-diethyldithiophosphatomethyl)-N,N'-dimethylethylenediamine.

Example 4

A mixture of 22 grams (0.25 mol) N,N'-dimethylethylenediamine and 105 grams (0.5 mol) of distilled diethyldithiophosphoric acid (Neutralization Equivalent 207) was prepared with cooling and diluted with dioxane and 44 grams (0.55 mol) of formalin was added. This mixture was allowed to react overnight. The next morning the material was washed with water and dried. The final product was a viscous red liquid which was the N,N'-di-(O,O-diethyldithiophosphatomethyl)N,N'-dimethylethylenediamine.

Example 5

Twenty-four grams (0.3 mol) of 37% formalin was added to 22 grams (0.25 mol) of morpholine slowly and with stirring. Following this, 70 grams (0.38 mol) of di-n-butyldithiophosphoric acid was added slowly and the mixture was stirred for 5 hours at room temperature and then allowed to stand overnight. It was then washed thoroughly with an aqueous carbonate solution and then with water and dried and stripped in the usual manner. The product, weighing 25 grams, was the O,O-dibutyldithiophosphatomethylmorpholine, analyzing 3.76% nitrogen and 18.2% sulfur.

Example 6

To ½ mol (47 grams) of aniline was added 45 grams (0.55 mol) of 37% formalin, the addition being made slowly and with rapid agitation. The mixture was diluted with ethyl alcohol after which 136 grams (0.5 mol) of di-n-butyldithiophosphoric acid was introduced slowly and with stirring during one hour. After 5 hours of agitation the solution was allowed to stand overnight at room temperature. The crude material was then washed with a dilute aqueous sodium carbonate solution and then with water and stripped in the usual manner to yield 174 grams of N-(O,O-di-n-butyldithiophosphatomethyl)-aniline, a viscous, light-colored oil.

Example 7

Twenty-seven grams (0.33 mol) of formalin was added with stirring to 36 grams (0.3 mol) of N-ethyl aniline and 64 grams (0.3 mol) of distilled diethyldithiophosphoric acid. Stirring was continued overnight, after which the reaction mixture was diluted with benzene and the organic layer washed successively with water, with dilute aqueous sodium carbonate solution and again with water. After drying and stripping of solvent and unreacted ethyl aniline by distillation at reduced pressure there was obtained 95 grams of N-(diethyldithiophosphatomethyl) - N - ethyl aniline, an amber-colored liquid.

Example 8

The procedure of Example 7 was repeated, but O,O-diisobutyldithiophosphoric acid was used instead of the diethyl ester. The product was a clear, viscous brown liquid that was soluble in lubricating oil and possessed definite antioxidant properties therefor. It contained 3.44% nitrogen, 16.5% sulfur and 8.2% phosphorus, corresponding to a compound of the formula

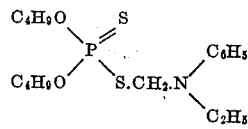

Example 9

Following the procedure of Example 7, ¼ mol of crude di(methylisobutylcarbinyl) dithiophosphoric acid (79 grams) was mixed with 31 grams of monoethyl aniline and 25 grams (0.31 mol) of 37% formalin was added. After stirring for 5 hours, diluting with benzene and washing with water, followed by distilling the benzene from the solution under vacuum, there was obtained 106 grams of a clear, brown, thick liquid which was N O,O-di(methylisobutylcarbinyl) dithiophosphatomethyl-N-ethyl aniline. Analysis showed it to contain 2.95% nitrogen, 14.5% sulfur and 7.3% phosphorus.

This product was soluble in lubricating oil. When tested by the Underwood corrosion test against silver cadmium bearings at 0.5% concentration the loss due to corrosion was 40 milligrams.

Example 10

A solution of 6 grams (0.0265 mol) of 2-anilino benzothiazole in benzene containing a small amount of dioxane was mixed with 2.3 grams (0.028 mol) of 37% formalin and 5.5 grams (0.0266 mol) of distilled diethyldithiophosphoric acid (Neutralization Equivalent 207). The reactants were stirred for 2½ hours and then let stand for 16 hours. The benzene-dioxane solution was washed three times with water and then the solvent was removed on a steam bath under vacuum to yield 8 grams of residue. This product was a very thick, partially crystalline mass.

Example 11

Thirty grams (0.37 mol) of 37% formalin was added slowly at 0–10° C. to 24 grams (0.33 mol) of 2-aminopyridine in 70 cc. of 2-B-ethanol. Thereafter 72 grams of distilled diethyldithiophosphoric acid (Neutralization Equivalent 213) was run in under the same conditions. The homogeneous solution was stirred ½ hour and then left at room temperature for 16 hours. Benzene was added and the non-aqueous layer was washed twice with water. The residue obtained by stripping the benzene solution weight 53 grams and was a thick brown oil.

What we claim is:

1. A method of producing a triester of dithiophosphoric acid of the formula

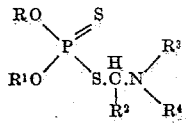

in which each of R and $R^1$ is a member of the group consisting of aliphatic hydrocarbon and aromatic hydrocarbon radicals, $R^2$ is a member of the group consisting of hydrogen and aliphatic hydrocarbon and aromatic hydrocarbon radicals, $R^3$ is a member of the group consisting of aliphatic hydrocarbon, heterocyclic, and aromatic hydrocarbon radicals, and $R^4$ is a member of the group consisting of hydrogen, aliphatic hydrocarbon, aromatic hydrocarbon, and heterocyclic radicals, which comprises condensing together an O,O-diester of dithiophosphoric acid of the formula

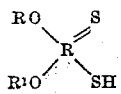

an aldehyde of the formula

and an amine of the formula

in which R, $R^1$, $R^2$, $R^3$ and $R^4$ are as defined above.

2. Triesters of dithiophosphoric acid having the formula

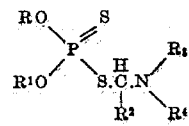

in which each of R and $R^1$ is a member of the group consisting of aliphatic hydrocarbon and aromatic hydrocarbon radicals, $R^2$ is a member of the group consisting of hydrogen, aliphatic hydrocarbon, and aromatic hydrocarbon radicals, $R^3$ is a member of the group consisting of aliphatic hydrocarbon, aromatic hydrocarbon, and heterocyclic radicals, and $R^4$ is a member of the group consisting of hydrogen, aliphatic hydrocarbon, aromatic hydrocarbon, and heterocyclic radicals.

3. A composition according to claim 2 in which $R^2$ is hydrogen.

4. A composition according to claim 2 in which R and $R^1$ are aliphatic hydrocarbon radicals, $R^2$ is hydrogen, $R^3$ is an aliphatic hydrocarbon radical, and $R^4$ is hydrogen.

5. Triesters of dithiophosphoric acid of the formula

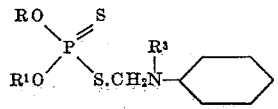

in which each of R and $R^1$ is an aliphatic hydrocarbon radical and $R^3$ is hydrogen.

EDWIN O. HOOK.
PHILIP H. MOSS.

REFERENCES CITED

The following references are of record in the file of this patent:

UNITED STATES PATENTS

| Number | Name | Date |
|---|---|---|
| 2,233,001 | Dickey | Feb. 25, 1941 |
| 2,443,264 | Mikeska | June 15, 1948 |
| 2,482,063 | Hechenbleikner | Sept. 13, 1949 |